United States Patent
Walker et al.

(10) Patent No.: US 9,680,637 B2
(45) Date of Patent: Jun. 13, 2017

(54) SECURE HASHING DEVICE USING MULTIPLE DIFFERENT SHA VARIANTS AND RELATED METHODS

(75) Inventors: Douglas Wayne Walker, Hilton, NY (US); Christopher David Mackey, Spencerport, NY (US)

(73) Assignee: HARRIS CORPORATION, Melbourne, FL (US)

( * ) Notice: Subject to any disclaimer, the term of this patent is extended or adjusted under 35 U.S.C. 154(b) by 1394 days.

(21) Appl. No.: 12/434,260

(22) Filed: May 1, 2009

(65) Prior Publication Data
US 2010/0278331 A1   Nov. 4, 2010

(51) Int. Cl.
*H04L 9/06* (2006.01)
*G06F 21/72* (2013.01)

(52) U.S. Cl.
CPC ............ *H04L 9/0643* (2013.01); *G06F 21/72* (2013.01); *H04L 2209/12* (2013.01)

(58) Field of Classification Search
CPC .................................................... H04L 9/0643
See application file for complete search history.

(56) References Cited

U.S. PATENT DOCUMENTS

| | | | |
|---|---|---|---|
| 5,623,545 A * | 4/1997 | Childs et al. ...................... 380/2 |
| 6,829,355 B2 | 12/2004 | Lilly ................................ 380/28 |
| 6,873,707 B1 | 3/2005 | Batcher | |
| 7,142,669 B2 | 11/2006 | Dworkin et al. | |
| 7,257,229 B1 | 8/2007 | Leshem | |
| 7,400,722 B2 | 7/2008 | Qi et al. .......................... 380/28 |
| 7,529,366 B2 * | 5/2009 | Ichinose et al. ................ 380/29 |
| 8,386,800 B2 | 2/2013 | Kocher et al. | |
| 2001/0050989 A1 | 12/2001 | Zakiya | |
| 2002/0032551 A1 | 3/2002 | Zakiya | |
| 2002/0056024 A1* | 5/2002 | Bui ............................... 711/118 |
| 2003/0135743 A1 | 7/2003 | Scheuermann ............... 713/189 |
| 2003/0223580 A1 | 12/2003 | Snell | |
| 2004/0093488 A1* | 5/2004 | Horanzy ............................ 713/1 |
| 2004/0260740 A1* | 12/2004 | Liu ....................... H04L 9/0643 708/490 |
| 2005/0089160 A1* | 4/2005 | Crispin ............... G06F 9/30018 380/28 |
| 2005/0132226 A1* | 6/2005 | Wheeler et al. .............. 713/201 |
| 2005/0144204 A1* | 6/2005 | Lee ....................... H04L 9/0643 708/200 |
| 2006/0002548 A1 | 1/2006 | Chu | |
| 2006/0034453 A1 | 2/2006 | Liu | |
| 2006/0036853 A1 | 2/2006 | Chen et al. | |
| 2007/0076866 A1* | 4/2007 | Vanstone et al. ............... 380/30 |

(Continued)

OTHER PUBLICATIONS

N. Sklavos "Implementation of the SHA-2 Hash Family Standard Using FPGAs", 2005, 227-248.*

(Continued)

*Primary Examiner* — Bradley Holder
(74) *Attorney, Agent, or Firm* — Allen, Dyer, Doppelt & Gilchrist, P.A.

(57) ABSTRACT

A monolithic integrated circuit (IC) secure hashing device may include a memory, and a processor integrated with the memory. The processor may be configured to receive a message, and to process the message using a given secure hash algorithm (SHA) variant from among different SHA variants. The different SHA variants may be based upon corresponding different block sizes of bits.

18 Claims, 8 Drawing Sheets

(56) References Cited

U.S. PATENT DOCUMENTS

| | | |
|---|---|---|
| 2007/0237327 A1 | 10/2007 | Taylor et al. |
| 2007/0244951 A1 | 10/2007 | Gressel et al. |
| 2007/0255941 A1 | 11/2007 | Ellis |
| 2008/0123841 A1 | 5/2008 | Plessier ............................ 380/28 |
| 2008/0130894 A1 | 6/2008 | Qj et al. |
| 2008/0240426 A1 | 10/2008 | Gueron et al. |
| 2008/0263117 A1 | 10/2008 | Rose et al. |
| 2010/0115286 A1 | 5/2010 | Hawkes et al. |
| 2011/0255689 A1 | 10/2011 | Bolotov et al. |

OTHER PUBLICATIONS

McLoone et al.; Efficient single-chip implementation of SHA-384 and SHA-512; Published in: Field-Programmable Technology, 2002. (FPT). Proceedings. 2002 IEEE International Conference on; Date of Conference: Dec. 16-18, 2002; IEEE Xplore.*

Wang et al; An HMAC processor with integrated SHA-1 and MD5 algorithms; Published in: Proceeding ASP-DAC '04 Proceedings of the 2004 Asia and South Pacific Design Automation Conference; pp. 456-458; ACM Digital Library.*

National Institute of Standards and Technology, "Secure Hash Standard," Aug. 1, 2002.

Anonymous, "Full Data Sheet—Tiny Multi-mode Hash Core for Altera FPGA," Helion Technology Limited, Feb. 25, 2008.

Anonymous, "Full Data Sheet—Tiny Multi-mode Hash Core for Xilinx FPGA," Helion Technology Limited, Feb. 25, 2008.

Anonymous, "SHA Hash Functions," Wikipedia Foundation, Inc. Mar. 4, 2009.

Glabb et al., "Multi-mode operator for SHA-2 hash functions", Journal of Systems Architecture, vol. 53, No. 2-3, Jan. 2007, pp. 127-138.

Sklavos et al., "Implementation of the SHA-2 hash family standard using FPGSa", The Journal of Supercomputing, vol. 31, No. 3, Mar. 2005, pp. 227-247.

Daemen et al., "Fast Hashing and Stream Encryption with Panama," 1998, 15 pages.

Roman et al., "A Survey of Cryptographic Primitives and Implementations for Hardware-Constrained Sensor Network Nodes," Computer Science Department, University of Malaga, Spain, May 30, 2007, 20 pages.

Poschmann et al., "New Light-Weight Crypto Algorithms for RFID," Institute for IT-Security, Ruhr-University, Bochum Germany, Jun. 2007, 5 pages.

Wu, "Hash Function JH," 2011, 3 pages.

Gong et al. "Klein: A new family of lightweight block ciphers," 2011, 19 pages.

Eisenbarth et al., "Compact Implementation and Performance Evaluation of Block Ciphers in ATtiny Devices," 2012, 17 pages.

* cited by examiner

SECURE HASHING DEVICE USING MULTIPLE DIFFERENT SHA VARIANTS AND RELATED METHODS

FIELD OF THE INVENTION

The present invention relates to the field of secure processing devices, and, more particularly, to secure hashing devices using secure hash algorithms and related methods.

BACKGROUND OF THE INVENTION

A typical wireless communication system may comprise a plurality of wireless devices transmitting and receiving messages with each other. These messages are typically arranged in formatted groups of data called packets. Each packet may comprise a header and a payload. The header may be used by the wireless communication system for routing the packet to the desired recipient, whereas the payload represents the data generated by a user to be transmitted. Typically, the size of the packet varies based upon the amount of data in the payload.

As wireless communications systems have become more prevalent, a robust security infrastructure has become desirable. Several approaches to developing such a security infrastructure have been disclosed. For example, the messages transmitted in the wireless communication system may be encrypted using an encryption algorithm, for example, Wired Equivalent Privacy (WEP), Advanced Encryption Standard (AES), and Data Encryption Standard (DES). Within the typical wireless communication system, the messages are authenticated by using a cryptographic hash function.

A particularly advantageous cryptographic hash function is a secure hash algorithm (SHA), as originally disclosed by the National Security Agency (NSA). SHA's may be used in conjunction with several known encryption standards, for example, the aforementioned AES and DES. The SHA is typically divided into three sub-families: SHA-0, SHA-1, and SHA-2. During hashing with a SHA, the data is organized into blocks of bits, the number of bits being locked for the particular algorithm. More particularly, the SHA-0 and SHA-1 families each divide the data into 512 bit blocks for processing. The SHA-2 family uses an algorithm with a variable digest size, which is distinguished as SHA-224, SHA-256, SHA-384, and SHA-512, and as disclosed in U.S. Pat. No. 6,829,355 to Lilly. The processing block bit size for the SHA-2 family is variable. More particularly, the SHA-224 and SHA-256 sub-families have processing block sizes of 512 bits whereas the SHA-384 and SHA-512 sub-families have processing block sizes of 1024 bits.

Depending on the application, it may be desirable to use one SHA family over another. For example, United States Patent Application Publication No. 2003/0135743 to Scheuermann discloses a device for hashing data using the SHA-1 family. In other applications, it may be helpful to have capabilities to hash using more than one SHA family and/or hash algorithm.

For example, United States Patent Application Publication No. 2008/0123841 to Plessier discloses a hashing device that authenticates data using a plurality of hash encryption methods. More particularly, this device may use either the SHA-1 family or the Message-Digest algorithm 5 (MD5).

Another approach is the Helion Tiny Multi-mode Hash Core, as available from Helion Technology Limited of Cambridge, England. This Hash Core is implemented on a field-programmable gate array (FPSA) and is capable of implementing several hash methods, which include MD5, SHA-1 family, and the SHA-224/256 variants of SHA-2, i.e. only SHA variants that use 512 bits processing block sizes only. In other words, this Hash Core is not capable of SHA variants using processing blocks larger than 512 bits.

SUMMARY OF THE INVENTION

In view of the foregoing background, it is therefore an object of the present invention to provide a secure hashing device with versatility and expanded capability.

This and other objects, features, and advantages in accordance with the present invention are provided by a monolithic integrated circuit (IC) secure hashing device comprising a memory, and a processor integrated with the memory. The processor may be configured to receive a message, and to process the message using a given secure hash algorithm (SHA) variant from among a plurality of different SHA variants. The plurality of different SHA variants may be based upon corresponding different block sizes of bits. Advantageously, the single monolithic IC device may process a plurality of different SHA variants that use different block sizes.

More specifically, the processor may authenticate the message using the given SHA variant. Also, the processor may comprise a message schedule generator for generating values for each round of SHA processing, and a round counter cooperating with the message schedule generator to count the rounds of SHA processing. For example, the plurality of different SHA variants may comprise a plurality of different SHA-2 variants. In particular, the plurality of different SHA variants may comprise SHA-224, SHA-256, SHA-384, and SHA-512, for example.

In some embodiments, the memory may comprise a plurality of registers cooperating with the processor for selecting the different block sizes of bits. Further, the plurality of registers may cooperate with the processor for storing the received message. The plurality of registers may cooperate with the processor for storing the processed message. Also, the plurality of registers may cooperate with the processor for providing a status of processing the message.

For example, the different block sizes of bits may comprise 512 bits and 1024 bits. In certain embodiments, the processor and the memory may be based upon a single field-programmable gate array (FPGA) device.

Another aspect is directed to a method of operating a monolithic IC secure hashing device comprising a memory, and a processor integrated with the memory. The method may include receiving a message, and processing the message using a given SHA variant from among a plurality of different SHA variants. The plurality of different SHA variants may be based upon corresponding different block sizes of bits.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Prime and multiple prime notations are used to indicate similar elements in alternative embodiments.

Figure 1:
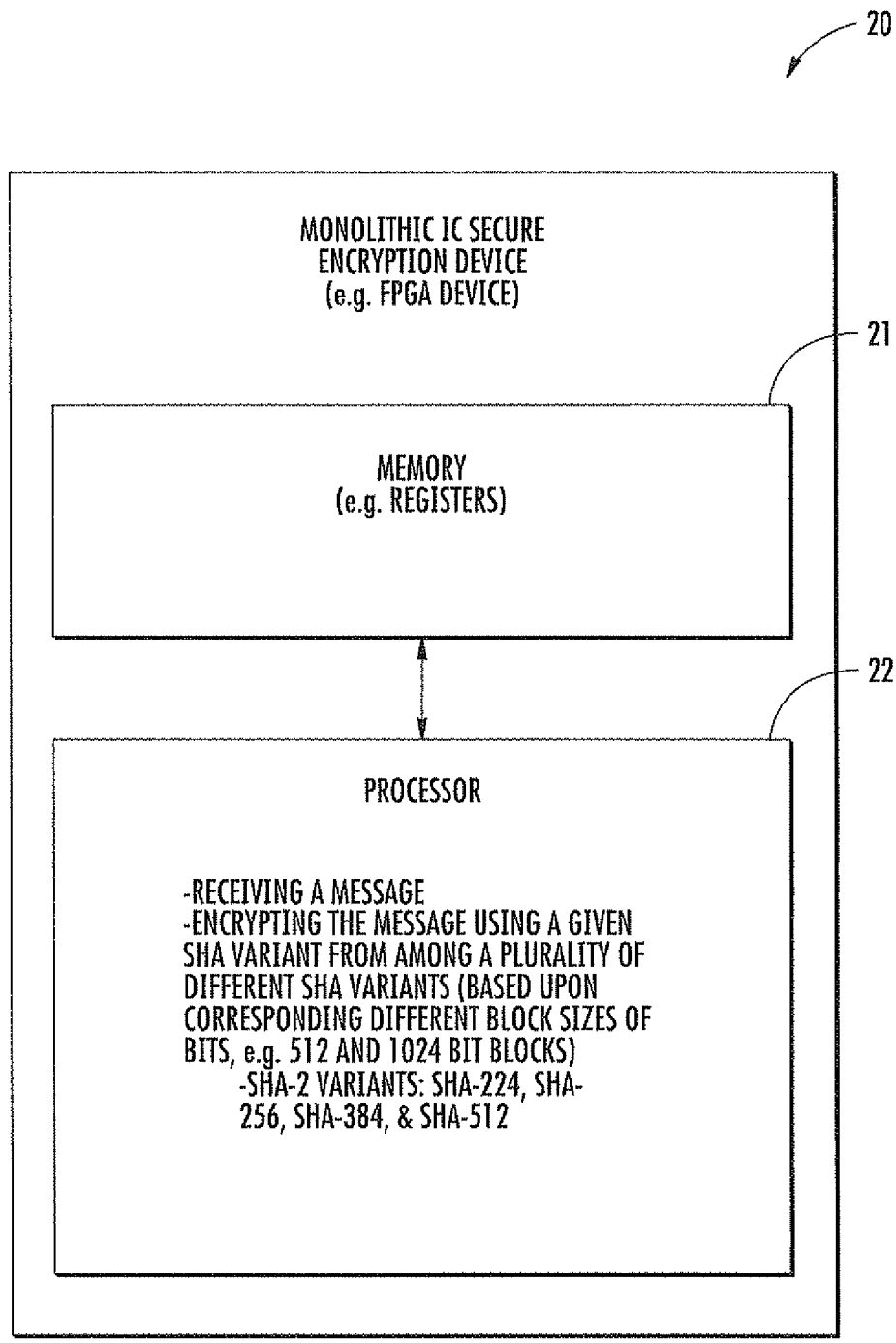
FIG. 1 is a schematic block diagram of a monolithic integrated circuit secure hashing device according to the present invention.

Referring initially to FIG. 1, a monolithic integrated circuit (IC) secure hashing device 20 according to the present invention is now described. The IC secure hashing device 20 illustratively includes a memory 21, and a processor 22 integrated with the memory. In other words, the processor 22 and memory 21 are housed on-chip and in one single device and/or core. For example, in some embodiments, the processor 22 and memory 21 may be implemented on a single field-programmable gate array (FPGA) device.

The processor 22 is illustratively configured to receive a message. The message comprises unauthenticated data. The processor 22 is illustratively configured to process, i.e. hash, the message using a given secure hash algorithm (SHA) variant from among a plurality of different SHA variants. More specifically, the processor 22 is illustratively configured to hash the message using the SHA-2 family of algorithms, i.e. the plurality of different SHA variants illustratively includes a plurality of different SHA-2 variants, for example, SHA-224, SHA-256, SHA-384, and SHA-512, as disclosed in Secure Hash Standard, Federal Information Processing Standards Publication (FIPS PUB) 180-2, August 2002 (SHS Spec).

As will be appreciated by those skilled in the art, the plurality of different SHA variants may be based upon corresponding different block sizes of bits. In particular, the SHA-224 and SHA-256 variants have processing block sizes of 512 bits. Differently, the SHA-384 and SHA-512 variants have processing block sizes of 1024 bits. Advantageously, the single monolithic IC device 20 may process a plurality of different SHA variants that use different block sizes, i.e. this single monolithic IC device has greater capability than the typical hash device yet takes up the resources of a single device/core.

Another aspect is directed to a method of operating a monolithic IC secure hashing device 20 comprising a memory 21, and a processor 22 integrated with the memory. The method may include receiving a message, and processing, i.e. hashing, the message using a given SHA variant from among a plurality of different SHA variants. The plurality of different SHA variants may be based upon corresponding different block sizes of bits.

Figure 2:
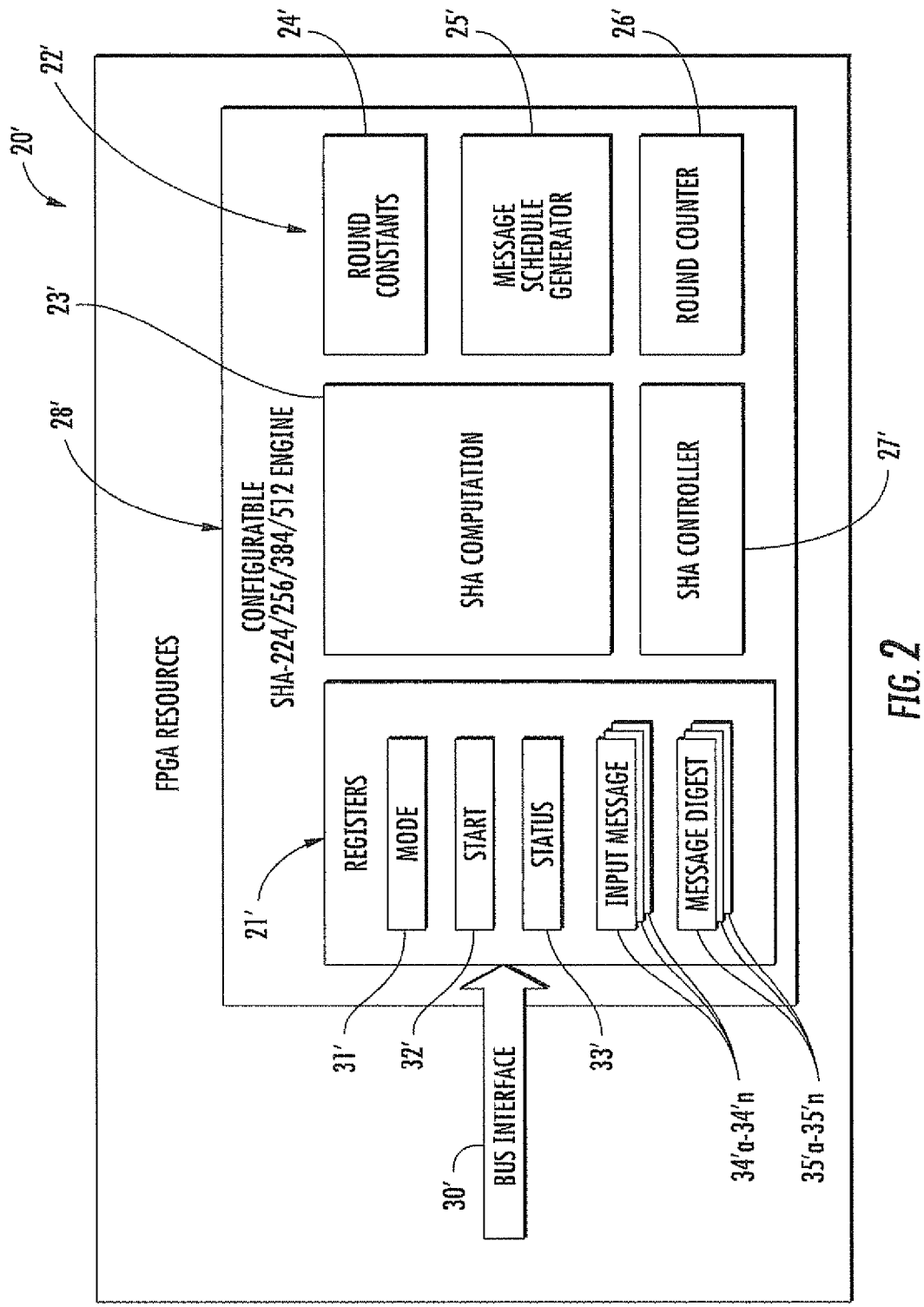
FIG. 2 is a schematic block diagram of another embodiment of the monolithic integrated circuit secure hashing device according to the present invention.

Referring now to FIG. 2, another embodiment of the single monolithic IC device 20' is now described. In this embodiment of the single monolithic IC device 20', those elements already discussed above with respect to FIG. 1 are given prime notation and most require no further discussion herein. This embodiment differs from the previous embodiment in that this embodiment is illustratively implemented on a single FPGA device comprising a configurable SHA engine 28' including the processor 22', and the memory 21'. Also, this embodiment of the single monolithic IC device 20' further illustratively includes a bus interface 30' coupled to the memory 21'.

Furthermore, this embodiment differs from the previous embodiment in that the memory 21' further includes a plurality of registers 31'-35'. In particular, the memory 21' illustratively includes a mode register 31' for controlling modes of operation, i.e. the mode register cooperates with the processor 22' for selecting the different block sizes of bits. Further, the memory 21' illustratively includes a start register 32' for initializing operation of the hashing process, and a status register 33' that cooperates with the processor 22' for providing a status of hashing the message.

Figure 4:
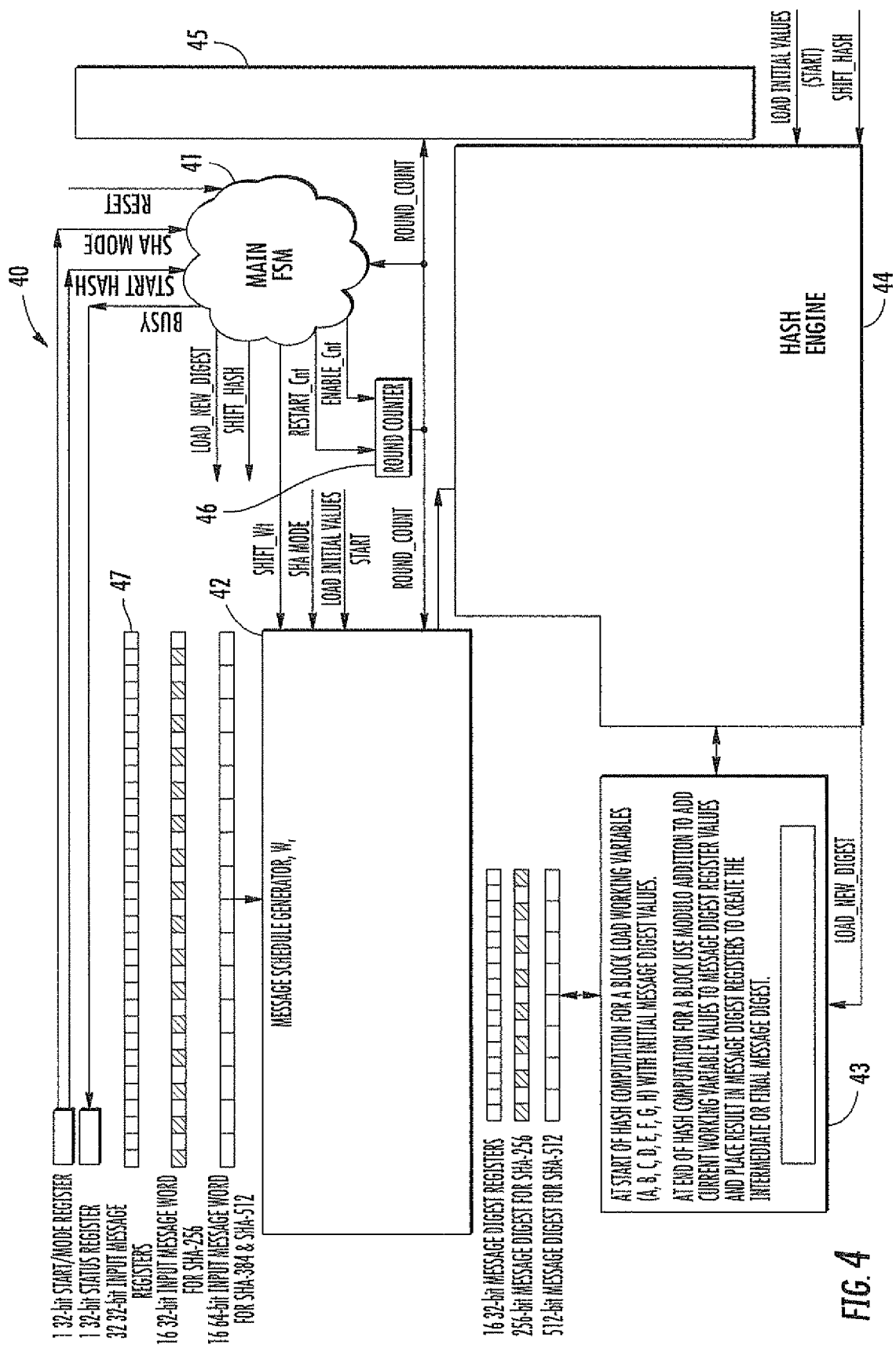
FIG. 4 is a detailed schematic block diagram of the monolithic integrated circuit secure hashing device according to the present invention.

Additionally, the memory 21' illustratively includes a plurality of ingest registers 34a'-34n' for loading the received unauthenticated message, for example, a 512-bit or 1024-bit message, and a plurality of digest registers 35a'-35n' for storing the hashed message for subsequent processing. Specifically, in certain embodiments, there are 32 32-bit input registers and 16 32-bit message digest registers (FIG. 4). As will be appreciated by those skilled in the art, the digest registers 35a'-35n' create a "message digest," as disclosed in SHS Spec. The size of the output, in bits, is defined by the SHA algorithm, for example, SHA-384 has a 384-bit message digest.

Moreover, this embodiment differs from the previous embodiment in that the processor 22' further illustratively includes a message schedule generator 25' for generating values for each round of SHA processing, and a round counter 26' cooperating with the message schedule generator to count the rounds of SHA processing. Moreover, the processor 22' illustratively includes a SHA computation unit 23' for performing SHA processing, a SHA controller 27' cooperating with the SHA computation unit, and a SHA round constants module 24' for providing round constants for SHA processing, as will be appreciated by those skilled in the art.

Figure 3:
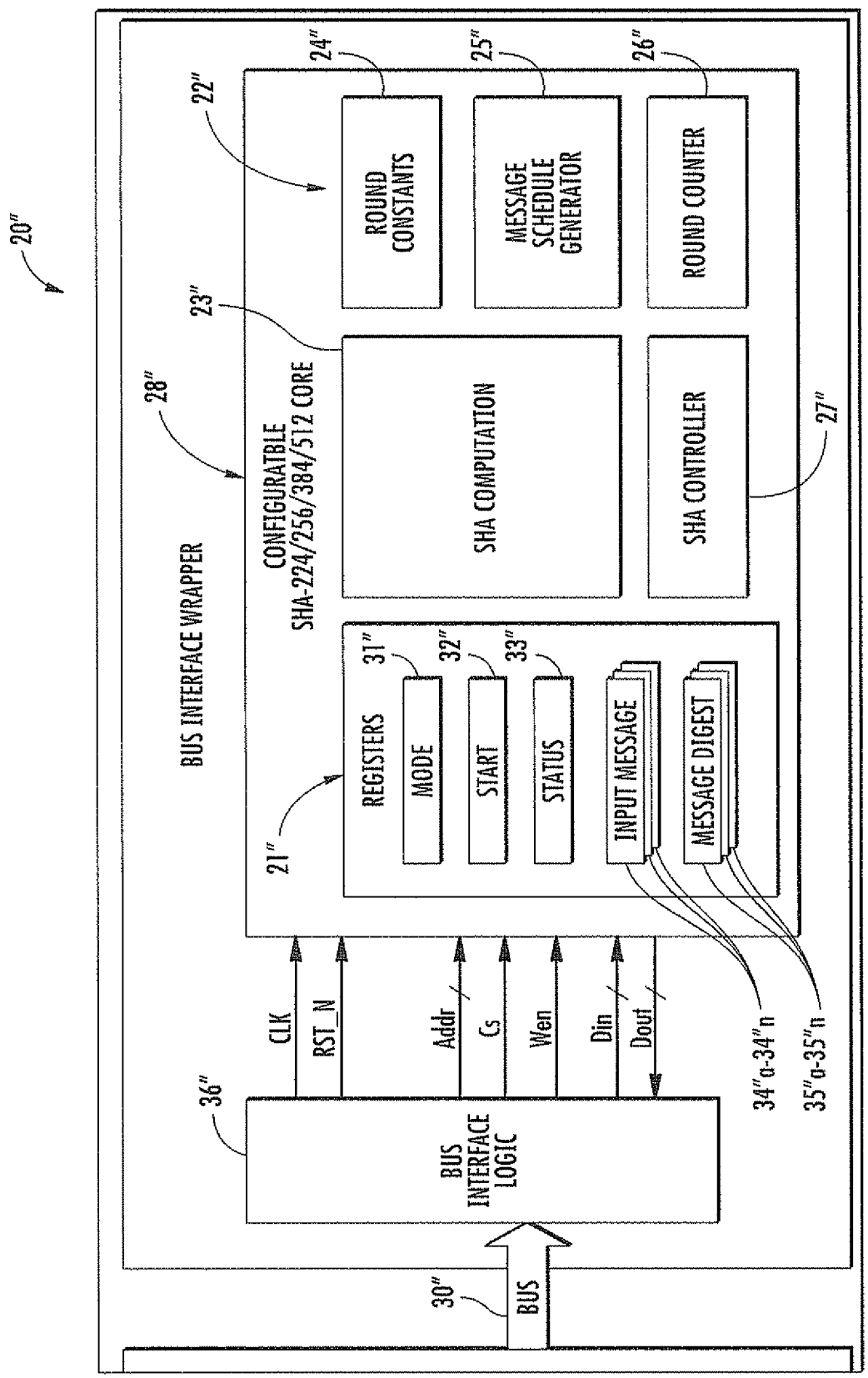
FIG. 3 is a schematic block diagram of yet another embodiment of the monolithic integrated circuit secure hashing device according to the present invention.

Referring now to FIG. 3, another embodiment of the single monolithic IC device 20" is now described. In this embodiment of the single monolithic IC device 20", those elements already discussed above with respect to FIG. 2 are given double prime notation and most require no further discussion herein. This embodiment differs from the previous embodiment in that the single monolithic IC device 20" further includes a bus interface logic module 36" in between the memory 21" and the bus interface 30". The bus interface logic module 36' outputs a plurality of address fields to the memory 21'. The address fields illustratively include a CLK (system clock) signal, a RST_N (asynchronous reset) signal, an Addr (6 bit address) signal, a $C_s$ (Chip select) signal, a $W_{en}$ (write enable) signal, a $D_{in}$ (32 bit data in) signal, and a $D_{out}$ (32 bit data out) signal.

Referring to FIG. 4, as will be appreciated by those skilled in the art, an exemplary implementation (configurable SHA- 224/256/384/512 core) 40 of the single monolithic IC device 20 is illustrated. The configurable SHA core 40 may be designed to implement the SHA-224, SHA-256, SHA-384, and SHA-512 algorithm families, as disclosed in SHS Spec. These algorithms can be described in two stages: preprocessing and hash computation. The configurable SHA core 40 focuses on the hash computation and leaves the preprocessing stage to software based approaches.

This division of functionality was based upon a cost-benefit analysis of computing resources. More particularly, there exists availability of amble computing resources in software versus limited area requirements (hardware computing resources) within the FPGA. It was determined that the functionality within the preprocessing stage was well suited for software implementation as it does not significantly impact algorithm performance and provides a sizable reduction in the memory requirements of the FPGA.

The configurable SHA core 40 is designed to be architecture independent; therefore, in a majority of implementations, it will reside within a wrapper file, as will be appreciated by those skilled in the art. The configurable SHA core 40 illustratively includes a message schedule generator 42, a round counter 46, a SHA engine 44, a read-only memory (ROM) 45 for the round constants, a Block 43 cooperating with the SHA engine, a finite state machine (FSM) 41 cooperating with the round counter, the SHA engine, and the ROM, and a register interface 47 cooperating with the message schedule generator and the FSM.

As will be appreciated by those skilled in the art, Block 43 regulates how the initial hash value that was loaded into the message digest registers at the start of the process is then loaded into the working variable (A, B, C, etc.) registers of Block 44. Then, at the end of the hash processing of the current block, the values of the working variables are added to the initial hash values and are stored back into the message digest registers when enabled by the Load_New_Digest signal.

Figure 8:
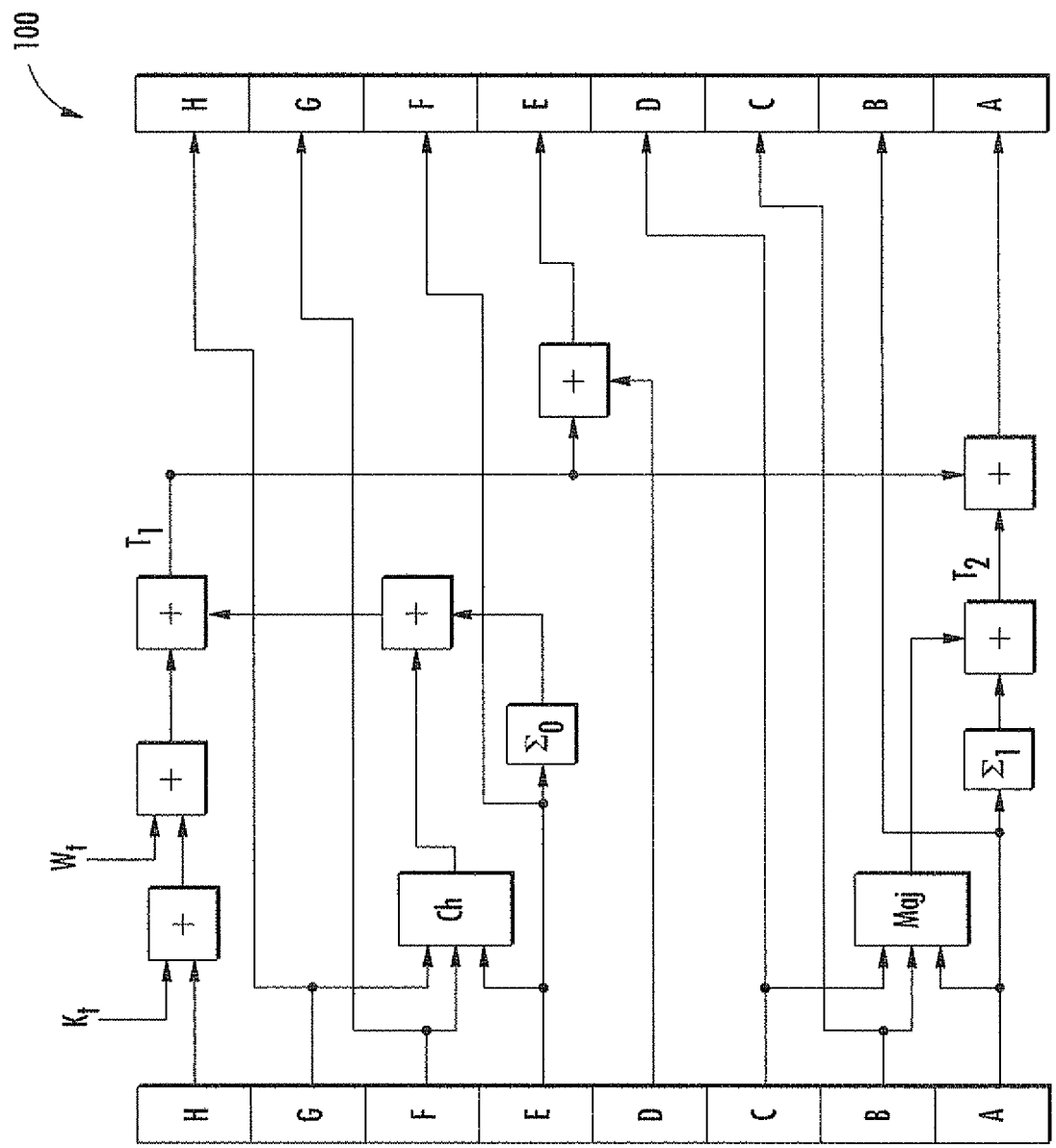
FIG. 8 is a schematic diagram illustrating operation of the SHA-2 processing in the monolithic integrated circuit secure hashing device of FIG. 4.

The message schedule generator 42 creates the message schedule $W_t$ for each round of the SHA algorithm, each round also using a round constant, $K_t$. The SHA engine 44 utilizes modulo addition and several functions, as disclosed in SHS Spec, to calculate the working variables (A, B, C, D, E, F, G, H) for each round of the algorithm in conjunction with $W_t$ and $K_t$. Referring briefly and additionally to FIG. 8, a diagram 100 illustrates a round of the SHA-2 processing in the configurable SHA core 40.

Figure 5:
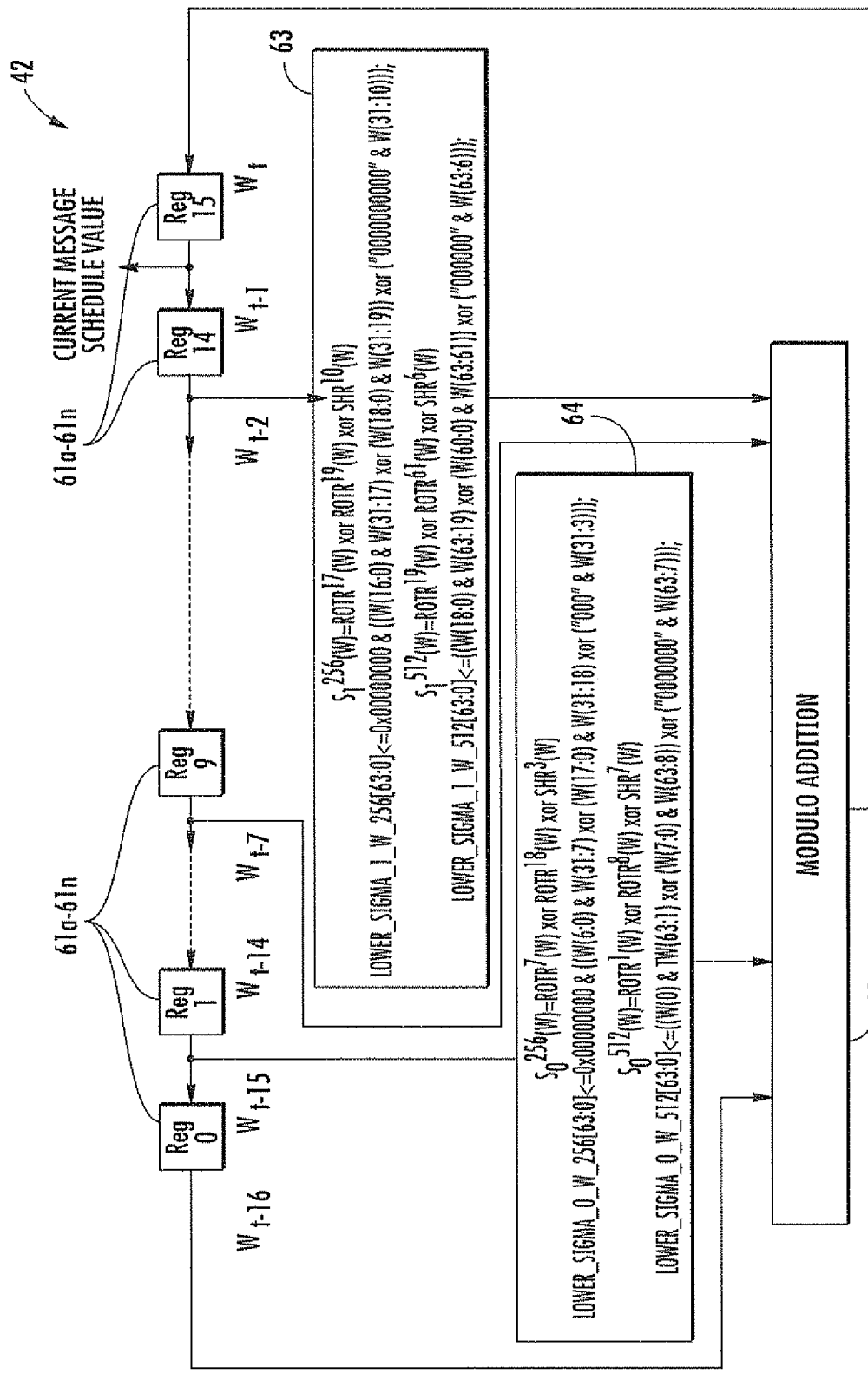
FIG. 5 is a schematic block diagram of the message schedule generator of the monolithic IC secure hashing device of FIG. 4.

Referring now additionally to FIG. 5, the message schedule generator 42 is illustrated in detail. The message schedule generator 42 creates a value for each round of the algorithm (64 or 80 values). The message schedule generator 42 is illustrated as a shift register 61a-61n. From the equation for the message scheduler, as disclosed in SHS Spec, it can be shown that only knowledge of the past 16 values is used to create the next message schedule value. Therefore, the first 16 values are loaded into the shift register 61a-61n and used by the design for the first 16 rounds, then the shift register is enabled and the current message schedule value is taken from register 15. The message schedule generator 42 also illustratively includes Block 62 for performing modulo addition on values from the shift register 61a-61n.

As will be appreciated by those skilled in the art, the message schedule generator 42 illustratively includes Blocks 63 and 64 for logical functions defined in Section 4 of the SHS Spec. Namely, $\sigma 0^{(256)}(x)$, $\sigma 1^{(256)}(x)$, $\sigma 0^{(512)}(x)$, $\sigma 1^{(512)}(x)$. The SHS Spec defines these logical functions to involve the Right Rotate (circular right shift) operation ROTR, the right shift operation SHR, and addition modulo $2^w$. As also appreciated by those skilled in the art, there are slight differences in the number of shifts between SHA-224/SHA-256 and SHA-384/SHA-512. Since the number of shifts in the functions are non-changing constants, the message schedule generator 42 replaces the time consuming process of shifting with predetermined bit manipulations. Therefore and advantageously, the SHS logical functions shown in Blocks 63 and 64 can be calculated in a single clock cycle.

Figure 6:
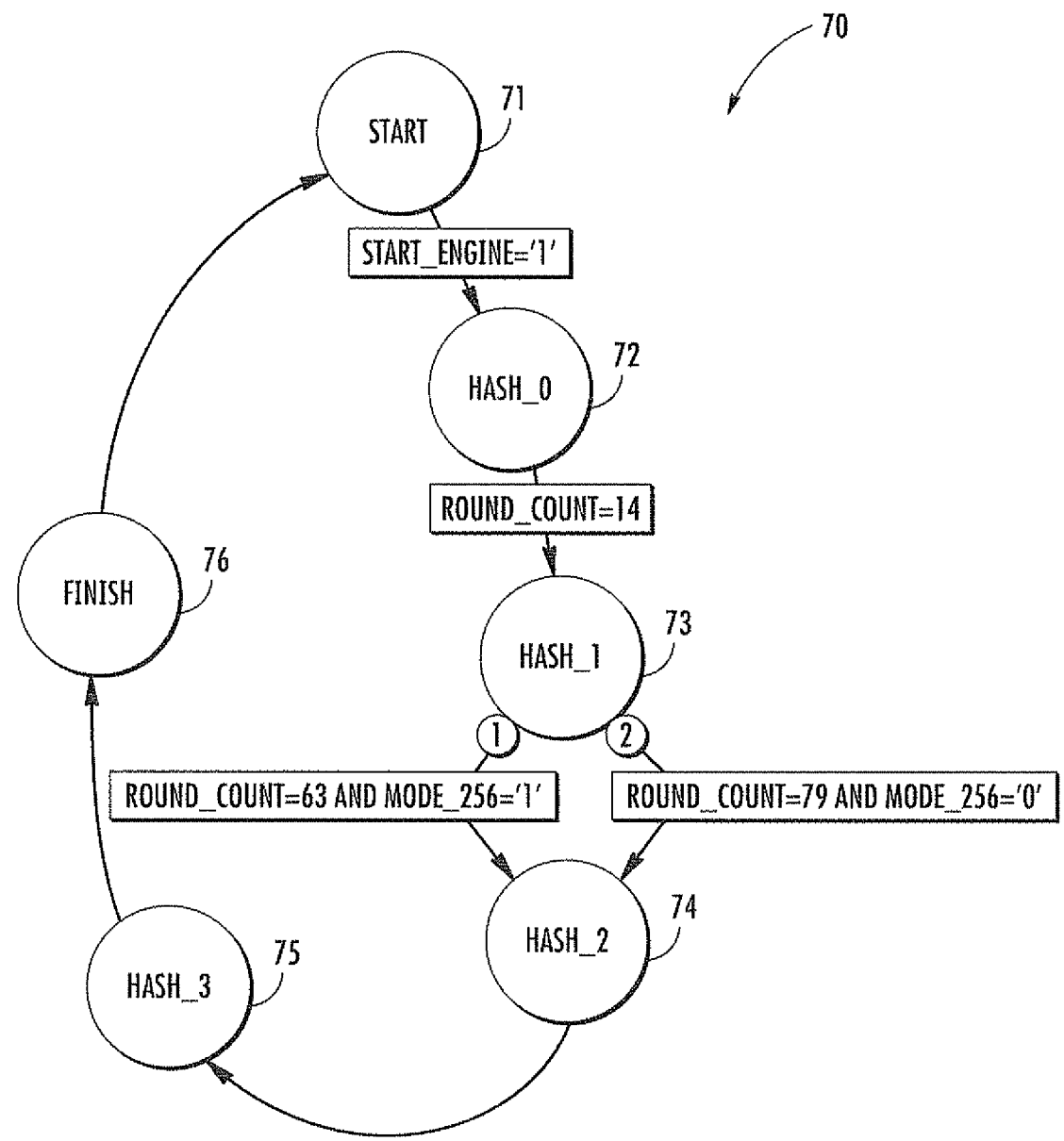
FIG. 6 is a schematic block diagram illustrating operation of the finite state machine of the monolithic integrated circuit secure hashing device of FIG. 4.

Referring now additionally to FIG. 6, a state diagram 70 illustrates operation of the FSM 41. The FSM 41 controls the operation of the round counter 46, the shifting of the message schedule values, the shifting of the working variables, and the loading of the new message digest value into the register set. The state diagram 70 begins at Block 71, and includes stating the SHA engine to move to Block 72 (Hash_0 state). Once the round count is 14, the state diagram 70 moves to Block 73 (Hash_1 state). If the round count equals 63 and the mode_256 signal equals 1 or if the round count equals 79 and the mode_256 signal equals 0, the state diagram 70 moves to Block 74 (Hash_2 state) and then to Block 75 (Hash_3 state), ending at Block 76.

Figure 7:
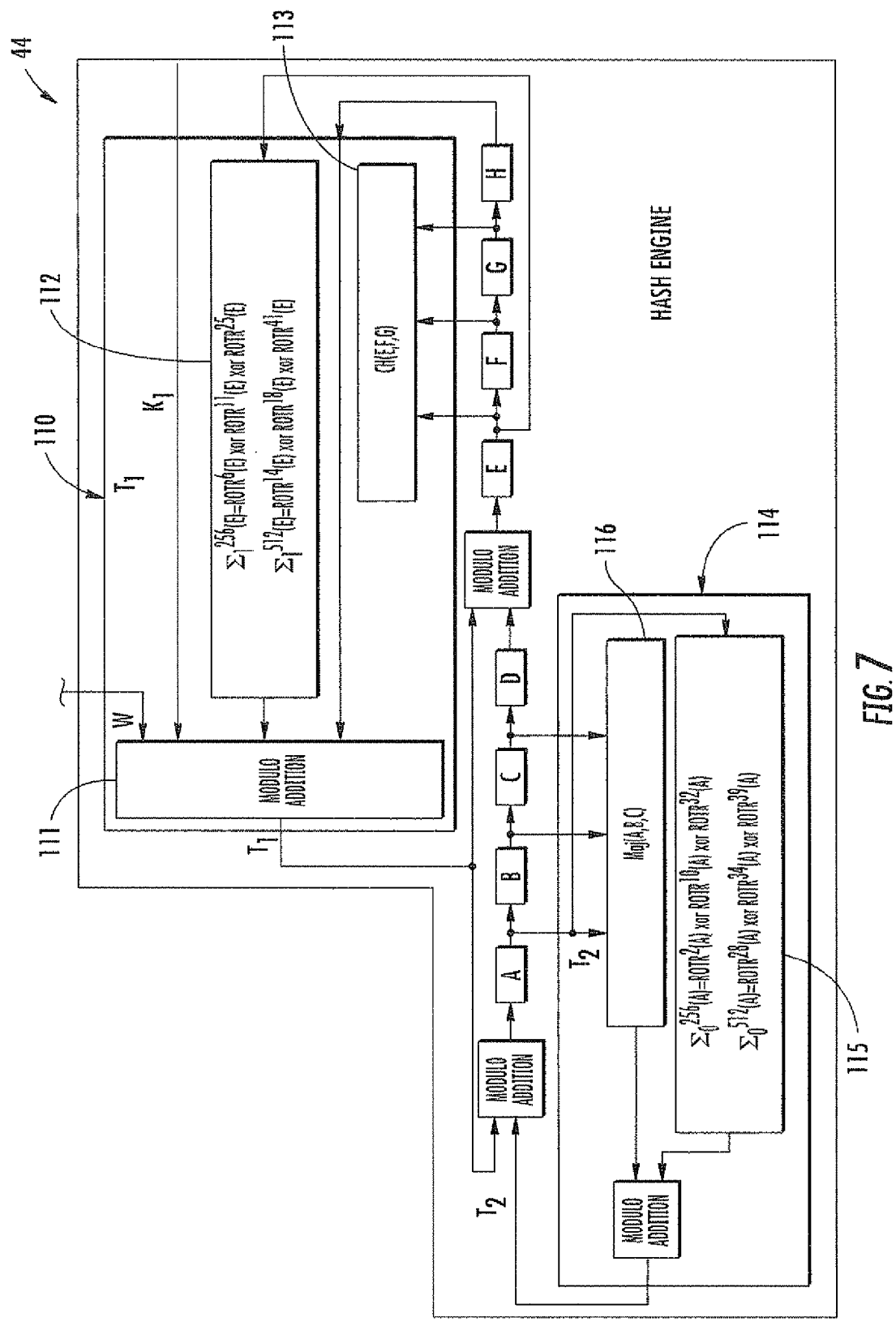
FIG. 7 is a schematic block diagram of the hash engine of the monolithic IC secure hashing device of FIG. 4

Referring now additionally to FIG. 7, the SHA engine 44 is illustrated in detail. Blocks 110 and Block 114 depict the logical functions $T_1$ and $T_2$ as defined by the SHS Spec. In SHA-224/SHA-256, $T_1 = h + \Sigma_1^{(256)}(e) + C_h(e, f, g) + K_t^{(256)} + W_t$. In SHA-224/SHA-256, $T_2 = \Sigma_0^{(256)}(a) + Maj(a, b, c)$. In SHA-384/SHA-512, $T_1 = h + \Sigma_1^{(512)}(e) + C_h(e, f, g) + K_t^{(512)} + W_t$. In SHA-384/SHA-512, $T_2 = \Sigma_0^{(512)}(a) + Maj(a, b, c)$. The + sign is used to represent modulo Addition.

The SHA engine 44 illustratively includes Block 111 for providing modulo addition in the calculation of the logical functions $T_1$ and $T_2$. The SHA engine 44 also illustratively includes Blocks 112 and 115, which can be described similarly as Blocks 63 and 64, described above. The SHS Spec defines these logical functions to involve the Right Rotate (circular right shift) operation ROTR and addition modulo $2^w$. There are slight differences in the number of shifts between SHA-224/SHA-256 and SHA-384/SHA-512. Since the number of shifts in the functions are non-changing constants, the SHA engine 44 replaces the time consuming process of shifting with predetermined bit manipulations. Therefore, the SHS logical functions shown in Blocks 112 and 115 can be calculated in a single clock cycle. The SHA engine 44 illustratively includes Blocks 113 and 116 for providing logical functions defined by the SHS Spec. Ch(x, y, z) and Maj(x, y, z) involve bitwise operations, such as bitwise AND, OR, XOR, and NOT.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A monolithic integrated circuit (IC) secure hashing device comprising:
    a plurality of registers comprising a mode register configured to store a mode of operation value; and
    a processor integrated with said plurality of registers and configured to
    receive a message, select a given secure hash algorithm (SHA) variant based upon the mode of operation value,
process the message using the given SHA variant from among a plurality of different SHA variants, the plurality of different SHA variants being based upon corresponding different block sizes of bits, and
cooperate with said plurality of registers for selecting the different block sizes of bits for the plurality of different SHA variants and for controlling SHA processing of the message;
said processor comprising
a message schedule generator configured to generate values for each round of SHA processing,
a round counter cooperating with said message schedule generator and configured to count the rounds of SHA processing, and
circuitry coupled to said message schedule generator and said plurality of registers, and configured to coordinate the SHA processing of the message, said circuitry comprising a finite state machine.

2. The monolithic IC secure hashing device according to claim 1 wherein said processor authenticates the message using the given SHA variant.

3. The monolithic IC secure hashing device according to claim 1 wherein the plurality of different SHA variants comprises SHA-224, SHA-256, SHA-384, and SHA-512.

4. The monolithic IC secure hashing device according to claim 1 wherein said plurality of registers cooperates with said processor for storing the received message.

5. The monolithic IC secure hashing device according to claim 1 wherein said plurality of registers cooperates with said processor for storing the processed message.

6. The monolithic IC secure hashing device according to claim 1 wherein said plurality of registers cooperates with said processor for providing a status of processing the message.

7. The monolithic IC secure hashing device according to claim 1 wherein the different block sizes of bits comprise 512 bits and 1024 bits.

8. The monolithic IC secure hashing device according to claim 1 wherein said processor and said plurality of registers are based upon a single field-programmable gate array (FPGA) device.

9. A monolithic integrated circuit (IC) secure hashing device comprising:
a plurality of registers comprising a mode register configured to store a mode of operation value, and a status register configured to store a hash operation status value; and
a processor integrated with said plurality of registers and configured to
receive a message,
select a given secure hash algorithm-2 (SHA-2) variant based upon the mode of operation value,
process the message using the given SHA-2 variant from among a plurality of different SHA-2 variants, the plurality of different SHA-2 variants being based upon corresponding different block sizes of bits,
update the hash operation status value based upon the processing of the message, and
cooperate with said plurality of registers for selecting the different block sizes of bits for the plurality of different SHA-2 variants and for controlling SHA-2 processing of the message;
said processor comprising
a message schedule generator configured to generate values for each round of SHA-2 processing,
a round counter cooperating with said message schedule generator and configured to count the rounds of SHA-2 processing, and
circuitry coupled to said message schedule generator and said plurality of registers, and configured to coordinate the SHA-2 processing of the message, said circuitry comprising a finite state machine.

10. The monolithic IC secure hashing device according to claim 9 wherein said processor authenticates the message using the given SHA-2 variant.

11. The monolithic IC secure hashing device according to claim 9 wherein the different SHA-2 variants comprise SHA-224, SHA-256, SHA-384, and SHA-512.

12. The monolithic IC secure hashing device according to claim 9 wherein said plurality of registers cooperates with said processor for storing the received message.

13. The monolithic IC secure hashing device according to claim 9 wherein said plurality of registers cooperates with said processor for storing the processed message.

14. A method of operating a monolithic integrated circuit (IC) secure hashing device comprising a plurality of registers comprising a mode register storing a mode of operation value, and a processor integrated with the plurality of registers, the method comprising:
receiving a message;
selecting a given secure hash algorithm (SHA) variant based upon the mode of operation value;
processing the message using the given SHA variant from among a plurality of different SHA variants, the plurality of different SHA variants being based upon corresponding different block sizes of bits;
selecting the different block sizes of bits for the plurality of different SHA variants and based upon the plurality of registers cooperating with the processor; and
using the plurality of registers integrated with the processor to control SHA processing of the message;
the processor comprising
a message schedule generator configured to generate values for each round of SHA processing,
a round counter cooperating with the message schedule generator and configured to count the rounds of SHA processing, and
circuitry coupled to the message schedule generator and the plurality of registers, and configured to coordinate the SHA processing of the message, the circuitry comprising a finite state machine.

15. The method according to claim 14 wherein the processing comprises authenticating the message using the given SHA variant.

16. The method according to claim 14 wherein the plurality of different SHA variants comprises a plurality of different SHA-2 variants.

17. The method according to claim 14 wherein the plurality of different SHA variants comprises SHA-224, SHA-256, SHA-384, and SHA-512.

18. The method according to claim 14 wherein the different block sizes of bits comprise 512 bits and 1024 bits.

* * * * *